United States Patent
Sato et al.

(10) Patent No.: US 9,719,814 B2
(45) Date of Patent: Aug. 1, 2017

(54) NEEDLE TYPE GAUGE

(71) Applicants: NIPPON SEIKI CO., LTD., Nagaoka-shi, Niigata (JP); HONDA MOTOR CO., LTD., Tokyo (JP)

(72) Inventors: Takumi Sato, Nagaoka (JP); Takashi Hori, Nagaoka (JP); Tetsuro Togawa, Nagaoka (JP); Ryo Kobe, Wako (JP); Munehiro Yasuda, Wako (JP); Shinji Kamon, Wako (JP)

(73) Assignees: NIPPON SEIKI CO., LTD., Nagaoka-shi (JP); HONDA MOTOR CO., LTD., Tokyo (JP)

( * ) Notice: Subject to any disclaimer, the term of this patent is extended or adjusted under 35 U.S.C. 154(b) by 69 days.

(21) Appl. No.: 14/511,883

(22) Filed: Oct. 10, 2014

(65) Prior Publication Data

US 2015/0103509 A1 Apr. 16, 2015

(30) Foreign Application Priority Data

Oct. 15, 2013 (JP) ................................. 2013-215046

(51) Int. Cl.
*B60Q 3/04* (2006.01)
*G01D 11/28* (2006.01)
(Continued)

(52) U.S. Cl.
CPC ........ *G01D 11/28* (2013.01); *B60K 2350/408* (2013.01); *G01D 13/22* (2013.01); *G01D 13/265* (2013.01)

(58) Field of Classification Search
CPC ...... G01D 11/28; G01D 13/22; G01D 13/265; B60K 2350/408; B60Q 3/002; B60Q 3/042; B60Q 3/044; B60Q 3/046
(Continued)

(56) References Cited

U.S. PATENT DOCUMENTS 4,872,093 A * 10/1989 Shimizu ................. G01D 11/28
116/288
4,872,415 A * 10/1989 Nakadozono .......... B60Q 3/004
116/288
(Continued)

FOREIGN PATENT DOCUMENTS

CN 1383483 12/2002
CN 1702437 11/2005
(Continued)

OTHER PUBLICATIONS

Japanese Office Action with English translation dated Sep. 1, 2015, 5 pages.
(Continued)

*Primary Examiner* — Andrew Coughlin
*Assistant Examiner* — Colin Cattanach
(74) *Attorney, Agent, or Firm* — Rankin, Hill & Clark LLP

(57) ABSTRACT

A needle type gauge includes: a needle that includes a main rotating portion that rotates around a rotation shaft, and an indicator which points out an index part; and an actuator. The main rotating portion includes a light emitting portion that emits strip-shaped light. The light emitting portion is located at the actuator side relative to the indicator, and emits the strip-shaped light to a nearby area to the indicator and located, relative the indicator, at one side in a rotation direction of the indicator. The needle includes a shield which extends in a direction of the actuator from the indicator, extends along the indicator, and blocks, among the strip-shaped light, light directed from the one side in the rotation direction of the indicator to the other side therein.

6 Claims, 4 Drawing Sheets

(51) Int. Cl.
*G01D 13/22* (2006.01)
*G01D 13/26* (2006.01)

(58) Field of Classification Search
USPC ......... 362/23.14, 23.18, 23.19, 23.21, 23.07, 362/23.11, 23.12, 23.13, 23.2
See application file for complete search history.

(56) References Cited

U.S. PATENT DOCUMENTS

| | | | | |
|---|---|---|---|---|
| 5,143,434 | A * | 9/1992 | Ohta | B60K 35/00 116/286 |
| 5,523,922 | A * | 6/1996 | Kato | G01D 11/28 362/23.19 |
| 6,302,551 | B1 * | 10/2001 | Matumoto | B60K 37/02 116/286 |
| 6,379,015 | B2 * | 4/2002 | Wilhelm | G01D 13/28 116/284 |
| 6,508,562 | B1 * | 1/2003 | Venkatram | G01D 11/28 116/286 |
| 6,511,194 | B1 * | 1/2003 | Noll | G01D 11/28 116/286 |
| 6,572,235 | B1 * | 6/2003 | Neugart | B60Q 3/044 362/23.02 |
| 6,595,667 | B1 * | 7/2003 | Obata | B60K 35/00 362/23.15 |
| 6,714,126 | B2 * | 3/2004 | Wada | B60K 37/02 116/286 |
| 9,243,937 | B2 * | 1/2016 | Fernandez Michel | G01D 13/04 |
| 2003/0189819 | A1 * | 10/2003 | Furuya | G01D 13/28 362/23.2 |
| 2006/0215412 | A1 * | 9/2006 | Muramatsu | B60Q 3/048 362/459 |
| 2012/0075831 | A1 * | 3/2012 | Tomono | B60K 37/02 362/23.16 |

FOREIGN PATENT DOCUMENTS

| | | | |
|---|---|---|---|
| JP | H05-40051 | | 2/1993 |
| JP | 05248896 A | * | 9/1993 ............. G01D 11/28 |
| JP | 2005-181054 | | 7/2005 |
| JP | 2007-271426 | | 10/2007 |
| JP | 2010-48646 | | 3/2010 |
| JP | 2010-276498 | | 12/2010 |

OTHER PUBLICATIONS

Chinese Office Action with English Translation dated Jun. 29, 2016, 18 pages.

\* cited by examiner

NEEDLE TYPE GAUGE

CROSS-REFERENCE TO RELATED APPLICATION

This application claims the benefit of Japanese Patent Application No. 2013-215046, filed on Oct. 15, 2013, the entire disclosure of which is incorporated by reference herein.

FIELD

This application relates generally to a needle type gauge.

BACKGROUND

An example conventionally known needle type gauge of this kind is disclosed in, for example, Unexamined Japanese Patent Application Kokai Publication No. 2007-271426. The needle type gauge disclosed in Unexamined Japanese Patent Application Kokai Publication No. 2007-271426 is a needle type speed meter, and includes a light transmissive needle turning in accordance with a speed, a needle illuminating diode to illuminate the needle, a light transmissive plate, and a light-transmissive-plate illuminating diode to illuminate the light transmissive plate.

According to the needle type gauge disclosed in Unexamined Japanese Patent Application Kokai Publication No. 2007-271426, however, the indication is too monotonic.

The present disclosure has been made in view of the foregoing circumstances, and it is an objective of the present disclosure to provide a needle type gauge that can provide a great looking indication.

SUMMARY

To accomplish the above objective, a needle type gauge according to an aspect of the present disclosure includes: a needle including a main rotating portion that rotates around a rotation shaft, and an indicator which rotates together with a rotation of the main rotating portion and which points out an index part; and an actuator that causes the main rotating portion to rotate, wherein: the main rotating portion includes a light emitting portion that emits strip-shaped light in a direction of a tip of the indicator upon reception of the light from a light source; the light emitting portion is located at the actuator side relative to the indicator, and emits the strip-shaped light to a nearby area to the indicator and located, relative the indicator, at one side in a rotation direction of the indicator when the needle type gauge is viewed from a front; and the needle includes a shield which extends in a direction of the actuator from the indicator, extends along the indicator when the needle type gauge is viewed from the front, and blocks, among the strip-shaped light, light directed from the one side in the rotation direction of the indicator to the other side therein.

According to the present disclosure, it becomes possible to provide a great looking indication.

BRIEF DESCRIPTION OF THE DRAWINGS

A more complete understanding of this application can be obtained when the following detailed description is considered in conjunction with the following drawings, in which.

DETAILED DESCRIPTION

An explanation will be given of a needle type gauge 1 according to an embodiment of the present disclosure with reference to FIGS. 1 to 4B. In the following explanation, a near side when the needle type gauge 1 is viewed from the front (that is, when a user views the needle type gauge 1 from the front to check an indicated value) is defined as "front", and a distant side is defined as a "back".

The needle type gauge 1 of this embodiment is a tachometer which is installed in a vehicle, such as an automobile or a motorcycle, indicates a revolution speed of an engine of the vehicle with a moving of a needle, thereby informing a user (driver) of the engine rev speed.

First of all, a structure of the needle type gauge 1 will be explained.

Figure 2:
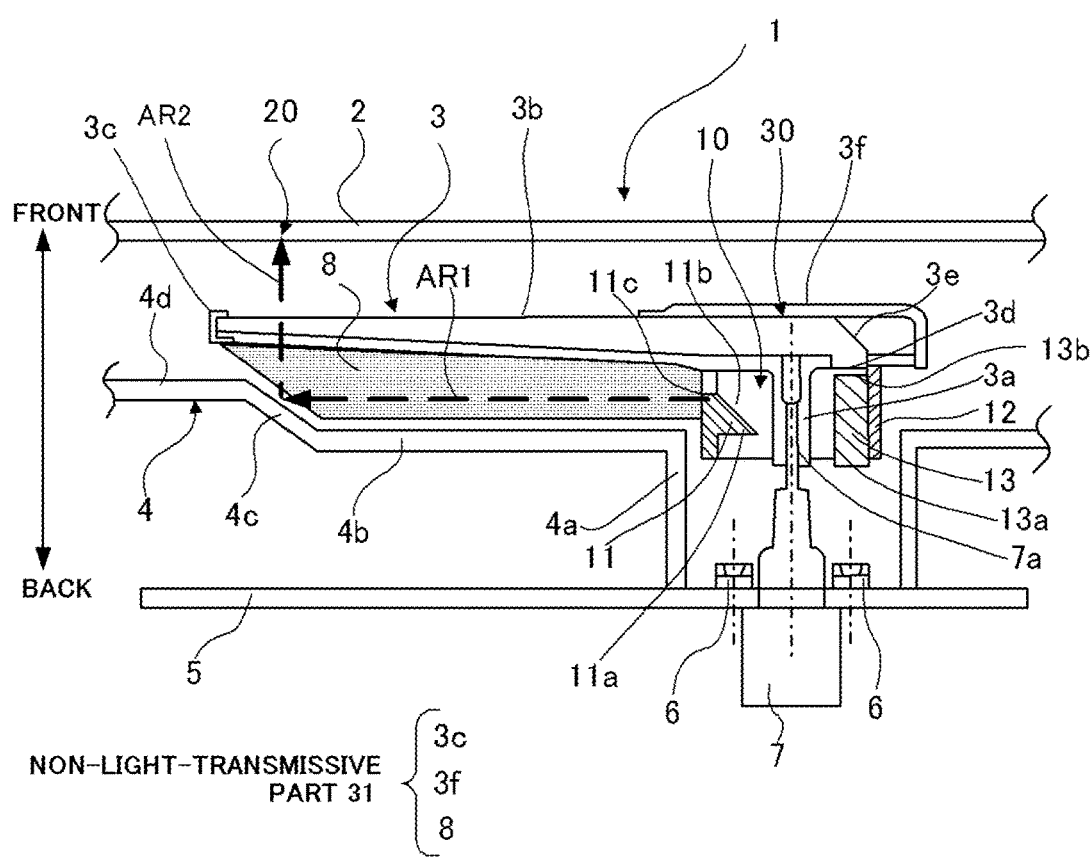
FIG. 2 is a cross-sectional view taken along a line A-A in FIG. 1 and illustrating a major part of the needle type gauge according to the embodiment.

As illustrated in FIG. 2, the needle type gauge 1 includes, from the front to the back, a dial plate 2, a needle 3, a casing 4 and a circuit board 5. The needle type gauge 1 further includes a light source 6 and an actuator 7 both mounted on the circuit board 5.

The needle 3 includes a main rotating portion 30 rotated by power of the actuator 7, an indicator 3b which rotates together with the main rotating portion 30 and which indicates an index part 20 of the dial plate 2, and a shading plate 8.

The light source 6 includes, for example, an LED (Light Emitting Diode). The light source 6 is mounted on the front side of the circuit board 5. Multiple light sources 6 are disposed side by side at an equal pitch on a circumference around an axial line of a rotation shaft 3a of the needle 3 so as to correspond to the movable range of the needle 3. Those light sources 6 (eight in the example case illustrated in the figure) are provided to illuminate the index part 20 of the dial plate 2 in accordance with a moving of the needle 3, and to light up the needle 3.

The actuator 7 includes, for example, a stepping motor, and causes a rotation shaft 7a to rotate under a control by a controller to be discussed later. The actuator 7 is mounted on the back side of the circuit board 5. The rotation shaft 7a of the actuator 7 extends toward the front of the circuit board 5 through a hole provided in the substrate of the circuit board 5. The rotation shaft 7a is coupled with the hollow rotation shaft 3a (which is included in the main rotating portion 30 of the needle 3). Hence, the needle 3 moves in accordance with the rotation of the rotation shaft 7a by the actuator 7. The actuator 7 moves the needle 3 to a position corresponding to the engine rev speed under the control of the controller.

The circuit board 5 includes, for example, a plate-shaped insulated substrate that is formed of a glass epoxy resin (GFRP: Glass Fiber Reinforced Plastics) and various types of wirings printed on the plate-shaped insulated substrate. The controller (unillustrated) that controls the operation of the needle type gauge 1 is mounted on the circuit board 5. This controller obtains, from the external device of the needle type gauge 1 (for example, an ECU (Electronic Control Unit) of the vehicle), vehicle information like an engine rev speed, and turns on/off the light sources 6 or drives the actuator 7 based on the obtained vehicle information.

The dial plate 2 is located in front of the needle 3, and includes, for example, a transparent plate formed of a polycarbonate resin and a light-shielding layer printed on the transparent plate.

The dial plate 2 includes the index part 20 for indicating a measured quantity. The index part 20 is represented as a part where no light-shielding printed layer is formed on the dial plate 2 (a so-called outline character), and includes a light transmissive window section 20*a*, scales 20*b*, and numbers 20*d*. That is, the light transmissive window section 20*a*, the scales 20*b*, and the numbers 20*d* are light transmissive. The index part 20 is provided in a circular arc shape of a substantially half-circle around the axial line of the rotation shaft 3*a* of the needle 3 when the dial plate 2 is viewed from the front.

Each of the numbers 20*d* represents a numerical value for the reference of the indicated value by the needle 3. The numbers 20*d* are disposed along a circular arc so as to increase the value in the clockwise direction when the dial plate 2 is viewed from the front. The scales 20*b* are provided along the external side of the numbers 20*d*. The scales 20*b* represents scales corresponding to respective numerical values represented by the numbers 20*d*. The light transmissive window section 20*a* includes multiple light transmissive windows 20*c*, and is provided at the outer periphery of the numbers 20*d*. The light transmissive windows 20*c* are each located between adjoining scales 20*b*.

Note that at least a part of the index part 20 may be formed by a light-transmissive printed layer (for example, a frost printing). The light transmissive window section 20*a* may be formed at the radial-direction inner side of the numbers 20*d*. The light transmissive window section 20*a* may be formed as holes passing through the dial plate 2.

The needle 3 includes the main rotating portion 30 rotating around the rotation shaft 3*a*, the indicator 3*b* formed integrally with the main rotating portion 30, and a non-light-transmissive part 31.

The main rotating portion 30 and the indicator 3*b* are formed transparently of, for example, a resin like PMMA (Polymethyl methacrylate). The non-light-transmissive part 31 is formed of, for example, predetermined black resin, and includes a cover 3*c*, a needle cap 3*f*, and the shading plate 8.

The main rotating portion 30 includes the rotation shaft 3*a* coupled with the rotation shaft 7*a* of the actuator 7. Hence, the main rotating portion 30 rotates around the rotation shaft 3*a*. The indicator 3*b* is provided so as to extend along the radial direction of the main rotating portion 30, and points out the index part 20.

The main rotating portion 30 includes a light receiving face 3*d* and an inclined face 3*e* at the opposite side to the direction in which the indicator 3*b* of the main rotating portion 30 extends. The light receiving face 3*d* faces the back of the main rotating portion 30, and receives light from the light source 6. The inclined face 3*e* is located in front of the light receiving face 3*d*, and reflects incident light from the light sources 6 through the light receiving face 3*d* in the direction of the tip of the indicator 3*b*. For example, a white foil is provided on the back face of the indicator 3*b* by, for example, hot stamping, thereby blocking light. Incident light through the light receiving face 3*d* is reflected by the inclined face 3*e*, is guided to the tip of the indicator 3*b*, and thus the indicator 3*b* is lighted up. Light hitting the back face among light guided in the direction of the tip of the indicator 3*b*, and incident light (for example, solar light) from the front side of the indicator 3*b* are reflected by the rear face of the indicator 3*b*, and are emitted to the front of the indicator 3*b*.

The cover 3*c* forming the non-light-transmissive part 31 is provided so as to surround the side face of the indicator 3*b*. The needle cap 3*f* covers the front side of the main rotating portion 30. The cover 3*c* and the indicator 3*b* are, for example, formed integrally with each other. In addition, for example, the cover 3*c* and the shading plate 8 are also formed integrally with each other. The shading plate 8 will be explained later.

In addition, the main rotating portion 30 includes a prism assembly (ASSY) 10. For example, the prism ASSY 10 is formed so as to encircle the rotation shaft 3*a* of the needle 3, and is coupled with the rotation shaft 3*a* by an unillustrated coupler. Hence, the prism ASSY 10 also turns together with the rotation of the rotation shaft 3*a*.

Figures 4A, 4B:
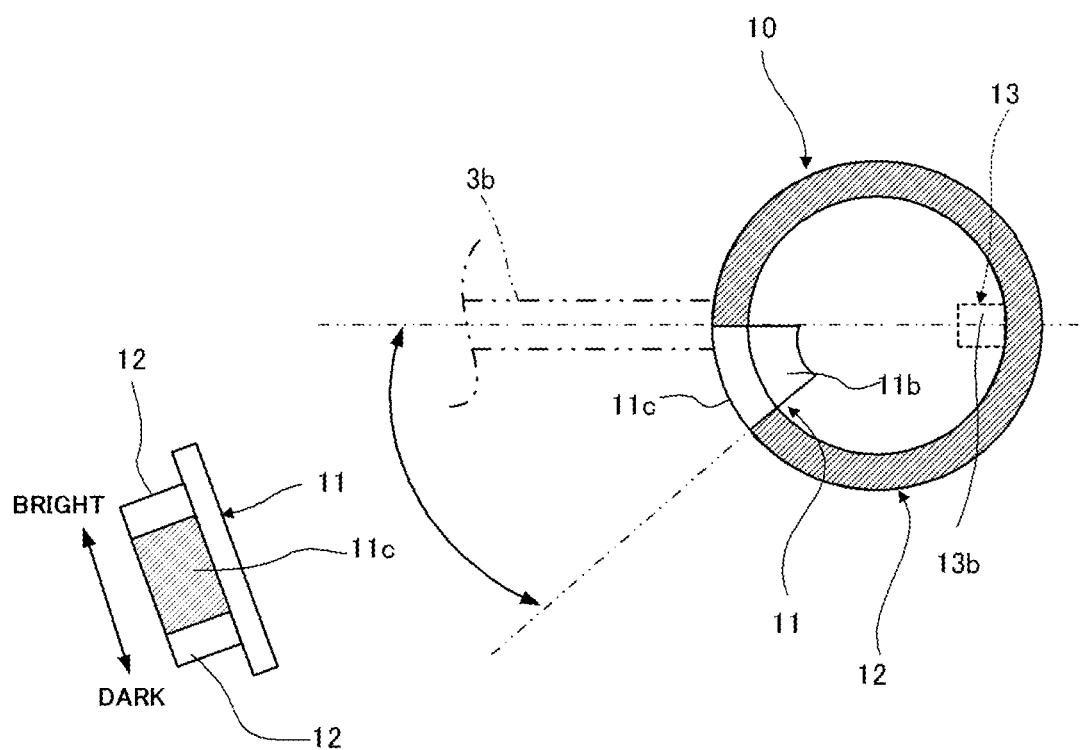
FIG. 4A is a front view illustrating a prism ASSY.
FIG. 4B is a diagram for explaining an emitting surface of a prism.

FIG. 4A is a front view of the prism ASSY 10 as viewed from the front. The prism ASSY 10 is formed in an annular shape, and a part thereof in the circumferential direction forms a prism (light emitting portion) 11, while the other major part is a colored portion 12. In the prism ASSY 10, a light guide 13 is formed at the opposite side to the prism 11 across the rotation shaft 3*a*. The prism 11, the colored portion 12, and the light guide 13 are formed integrally by insert molding or double molding. The prism 11 and the light guide 13 are formed of, for example, transparent PMMA, while the colored portion 12 is formed of, for example, a black synthetic resin. The prism 11 is formed in a fan shape as viewed from the front, and the light guide 13 is formed in a substantially rectangular shape as viewed from the front.

Figure 3:
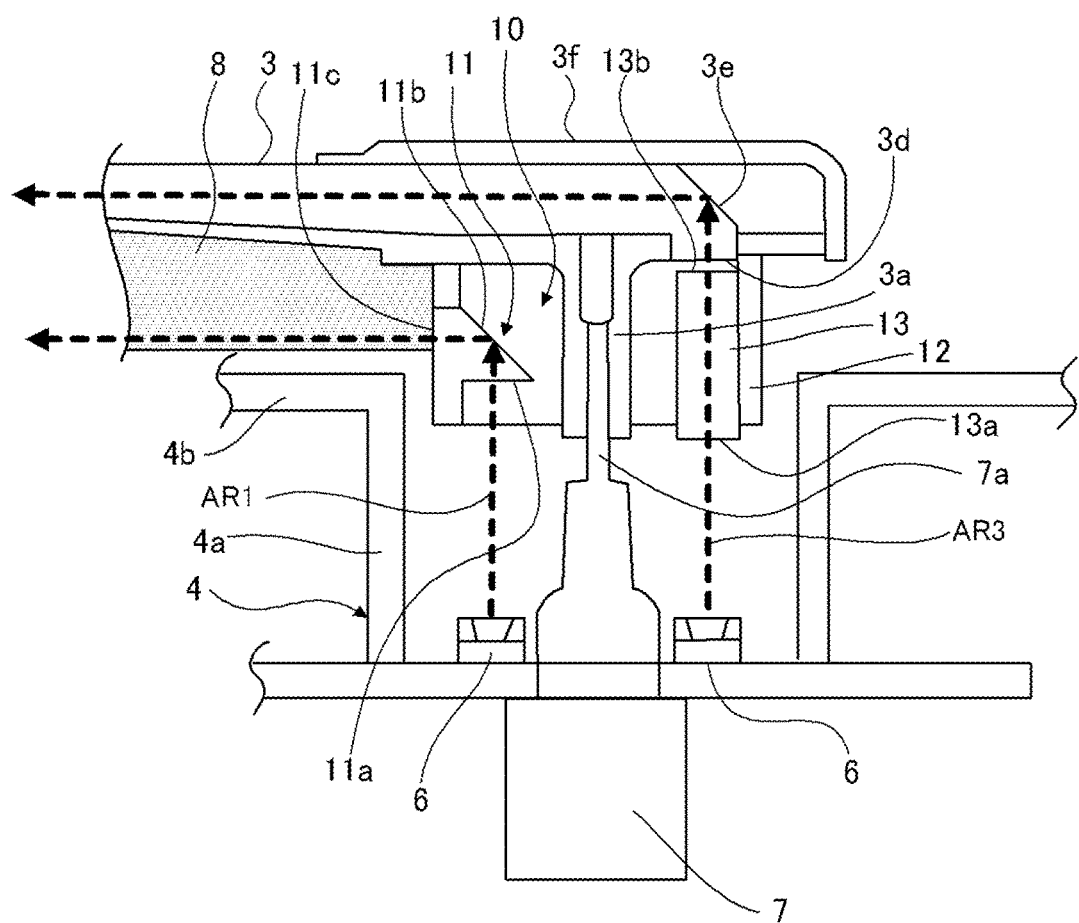
FIG. 3 is a cross-sectional view for explaining a path for light in the needle type gauge according to the embodiment.

The lateral cross-section of the prism 11 (cross-section of prism ASSY 10 in radial direction) is, as illustrated in FIGS. 2 and 3, formed in a substantially right trapezoidal shape, and the lateral cross-section of the colored portion 12 is formed in a rectangular shape having a side extending in the back-and-front direction as a longer side. The lateral cross-section of the light guide 13 is formed in a rectangular shape having a side extending in the back-and-front direction as a longer side.

Figure 1:
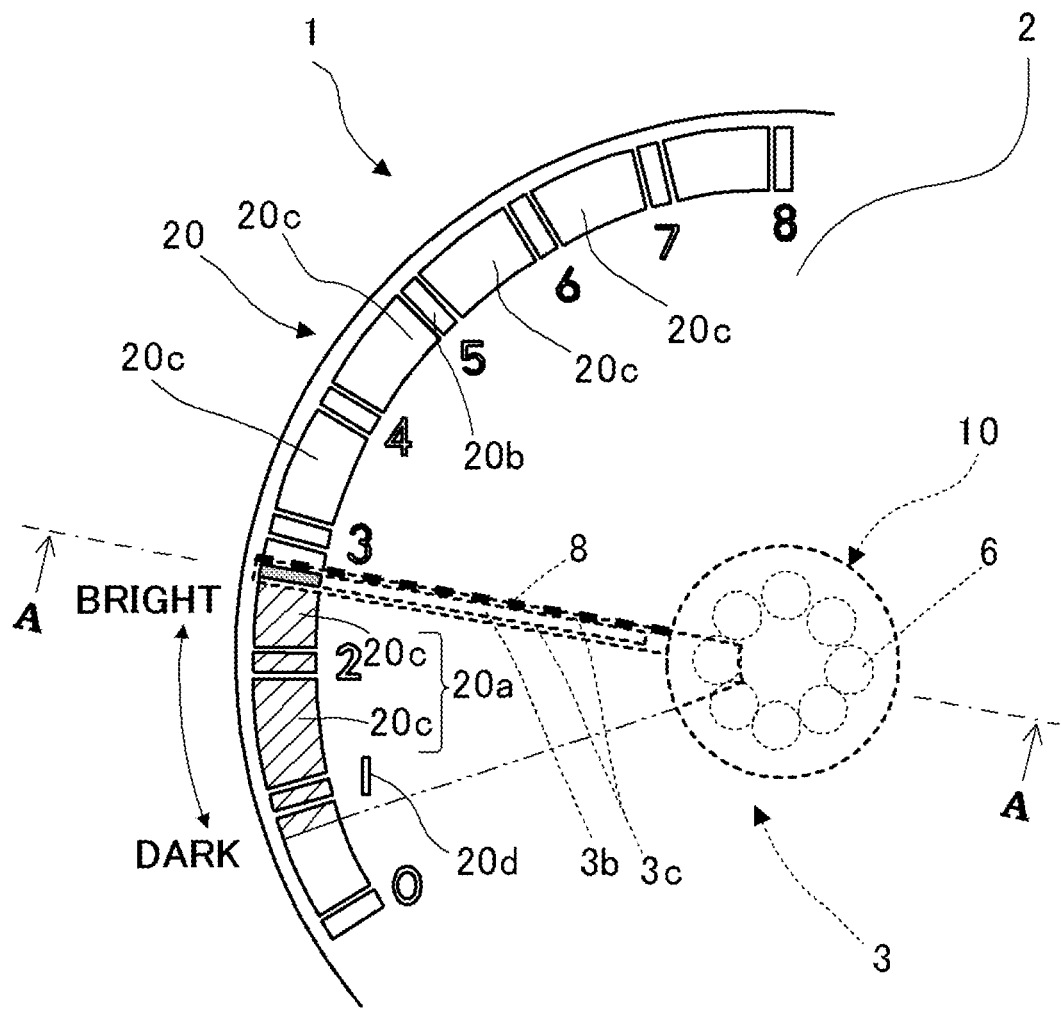
FIG. 1 is a front view illustrating a needle type gauge according to an embodiment of the present disclosure.

The prism 11 includes a light receiving face 11*a*, an inclined face 11*b*, and light emitting face 11*c*. In the prism 11, as illustrated in FIGS. 2 and 3, the bottom of the right trapezoidal shape portion, the inclined side of the right trapezoidal shape portion, and the side vertical to the bottom of the right trapezoidal shape portion correspond to the light receiving face 11*a*, the inclined face 11*b*, and the light emitting face 11*c*, respectively. The light receiving face 11*a* and the light emitting face 11*c* are transparent, thus light transmissive. The inclined face 11*b* is a reflector face formed of a transparent mirror surface. Hence, incident light from the light sources 6 through the light receiving face 11*a* of the prism 11 is reflected by the inclined face 11*b*, and is emitted in the direction of the tip of the needle 3 through the light emitting face 11*c* that is a part of the outer circumference face of the annular shape. This light is emitted in a manner parallel to the dial plate 2 as light in a fan shape (a form of strip-shaped light). The emitted light in a fan shape is reflected by a reflector 4 to be discussed later, and becomes light directed to the dial plate 2. Hence, the index part 20 is illuminated. The illumination range in a fan shape by this emitted light includes, as illustrated in FIG. 1, two light transmissive windows 20*c* among the multiple light transmissive windows 20*c* forming the light transmissive window section 20*a* and two internal numbers 20*d* relative to the two light transmissive windows 20*c*.

In addition, according to the needle type gauge 1, an unillustrated dial-plate illuminator is provided. As the dial-plate illuminator, an unillustrated illumination light guide is provided at the position corresponding to the numbers 20d at the back of the dial plate 2. An end face of the illumination light guide faces an unillustrated light source, and is lighted up by incident light from such an end face. The light-up of the illumination light guide gives an illumination to the numbers 20d from the back.

Note that the inclined face 11b of the prism 11 may be a reflector face that does not allow light to pass therethrough.

The light receiving face 11a of the prism 11 faces at least one of the eight light sources 6. As explained above, since the prism 11 rotates together with the rotation shaft 3a, the light source 6 to face the light receiving face 11a of the prism 11 switches in accordance with the rotation of the needle 3.

The light emitting face 11c of the prism 11 is formed as a textured surface. As illustrated in FIG. 4B, when the light emitting face 11c is viewed in the normal line direction of the light emitting face 11c, the density of the texture increases as becoming distant from the needle 3 (the counterclockwise direction of the needle 3). The higher the density of the texture becomes, the more it becomes difficult for light to pass through, and thus the emitted light becomes weak (dark). Accordingly, the light emitted in a fan shape becomes brighter near the needle 3.

A light receiving face 13a is formed at the back side of the light guide 13 of the prism ASSY 10, while a light emitting face 13b is formed at the front side. The light receiving face 13a faces at least one of the eight light sources 6. The light receiving face 13a receives light from another light source 6 that is different from the light source 6 that emits light to the light receiving face 11a of the prism 11. Since the light guide 13 rotates together with the rotation of the rotation shaft 3a, the light source 6 to face the light receiving face 13a of the light guide 13 switches in accordance with the rotation of the needle 3. The light emitting face 13b faces the light receiving face 3d located at the back side of the needle 3. Light from the light source 6 received by the light guide 13 through the light receiving face 13a is emitted from the light emitting face 13b, and enters the light receiving face 3d facing the light emitting face 13b. The incident light through the light receiving face 3d is reflected by the inclined face 3e, and is guided in the direction of the tip of the indicator 3b. Hence, the indicator 3b of the needle 3 is lighted up.

The casing 4 is fixed at the front side of the circuit board 5, and is formed of, for example, a light-shielding white polypropylene (PP) resin. The casing 4 includes a tubular portion 4a at the center portion, a plate portion 4b at the outer periphery of the tubular portion 4a, an inclined reflector 4c at the outer periphery of the plate portion 4b, and an outer circumference portion 4d at the outer periphery of the reflector 4c.

The tubular portion 4a at the center portion of the casing 4 is provided outwardly relative to the light sources 6 on the circular circumference, and is formed in a tube shape extending along the normal line of the circuit board 5. The rotation shaft 3a of the needle 3 is located at the center of the tubular portion 4a. The tubular portion 4a guides light from the light sources 6 toward the front while shielding such light so as not to become widespread in the radial direction of the rotation shaft 3a of the needle 3.

The inclined reflector 4c of the casing 4 is formed as a part of a conical surface, and is disposed so as to face the light emitting face 11c of the prism 11. The reflector 4c reflects the emitted light in a fan shape from the light emitting face 11c of the prism 11 toward the direction of the dial plate 2 (that is, toward the driver). The inclination angle of the reflector 4c is set to be an angle that reflects the incident light by the reflector 4c and efficiently emits the reflected light toward the front of the dial plate 2. A surface process like mirror finishing is applied to the reflector 4c. Hence, the brightness of the reflected light can be maintained at high, and the index part 20 of the dial plate 2 can be efficiently illuminated. In addition, the reflector 4c may be formed as, for example, a textured surface to give a diffusion effect to the reflected light. By changing the density and depth of the concavity and the convexity of the textured surface, the reflected light can be altered so as to have contrasts (brightness and darkness).

The casing 4 may be formed of a black resin. Hence, when the dial plate 2 is viewed from the front, a so-called black-out condition that makes the interior of the casing 4 to be seen as black through the light transmissive window section 20a can be accomplished. This enables an indication with a high contrast, resulting in a great looking indication with an excellent visual effect. In addition to a direct formation of the reflector 4c on the casing 4, a sheet member like polycarbonate may be subjected to drawing and then pasted on the front surface of the casing 4 to form the reflector 4c.

The needle 3 includes the shading plate 8 formed integrally with the cover 3c (that is, the cover 3c, the needle cap 3f, and the shading plate 8 are formed integrally).

As illustrated in FIG. 1, the shading plate 8 extends along the indicator 3b when the needle type gauge 1 is viewed from the front. In this embodiment, the shading plate 8 covers the one side of the indicator 3b in the widthwise direction (clockwise side relative to the indicator 3b, and upper side in FIG. 1). In addition, the shading plate 8 extends toward the back of the indicator 3b and along the indicator 3b with a gap between the shading plate 8 and the plate portion 4b of the casing 4 and the reflector 4c of the casing 4.

The shading plate 8 employing such a structure blocks, among fan-shaped light emitted from the prism 11, light directed toward the other side from the one side in the rotation direction of the indicator 3b when the needle type gauge 1 is viewed from the front. In this case, the shading plate 8 blocks light directed from the counterclockwise-direction side of the indicator 3b (lower side in FIG. 1) toward the clockwise-direction side thereof (upper side in FIG. 1) (that is, the shading plate 8 suppresses a leak-out of light). This shading plate 8 enhances the contrast between the portion illuminated by light in a fan shape emitted from the prism 11 and the opposite portion to that portion across the indicator 3b, thereby accomplishing an excellent visual effect. In addition, when the needle type gauge 1 is viewed from the front, one end part of light in the fan shape overlapping the indicator 3b can be clearly recognized along the shading plate 8, facilitating the user to view the portion pointed out by the indicator 3b, resulting in a good looking indication.

The controller provided on the circuit board 5 controls the light sources 6 and turns on/off such light sources 6. The control by the controller links the turn on/off of the light sources 6 with the ON/OFF of a headlight switch, or with the ON/OFF of an ignition switch. When linked with the ON/OFF of the headlight switch, the light sources 6 are turned on when the headlights are turned on, or when linked with the ON/OFF of the ignition switch, the light sources 6 are always turned on while the engine is running. The light source for the dial-plate illumination is also likewise controlled by the controller.

Next, an explanation will be given of, in the needle type gauge 1 of this embodiment, partial illumination of the dial plate 2 and lighting up of the needle 3 by light emitted from the light sources 6.

Light emitted from the light source 6 facing the light receiving face 11a of the prism 11 of the prism ASSY 10 among the eight light sources 6 enters the light receiving face 11a of the prism 11. Light emitted from the other light sources 6 not facing the light receiving face 11a of the prism 11 and the light receiving face 13a of the light guide 13 is blocked by the tubular portion 4a of the casing 4 and the colored portion 12 of the prism ASSY 10, and thus the amount of light leaked to the exterior of the needle type gauge 1 from the gap around the rotation shaft 3a of the needle 3 can be reduced.

Light (indicated by an arrow AR1 in FIG. 2) hitting the inclined face 11b that is a transparent mirror surface among the incident light to the prism 11 through the light receiving face 11a is reflected by the inclined face 11b, emitted from the light emitting face 11c, and enters the reflector 4c of the casing 4. Reflected light (indicated by an arrow AR2 in FIG. 2) reflected by the reflector 4c of the casing 4 is emitted toward the index part 20 of the dial plate 2.

Since the light emitting face 11c of the prism 11 is formed in an arc shape around the axial line of the rotation shaft 3a of the needle 3, strip-shaped light emitted from the light emitting face 11c spreads in a fan shape around the axial line of the rotation shaft 3a. The spread angle is defined in accordance with the center angle of the prism 11. As explained above, the light emitting face 11c is a textured surface, and the density of the texture increases as becoming distant from the needle 3. Hence, light emitted by the light emitting face 11c becomes bright near the needle 3.

Light emitted by the light emitting face 11c of the prism 11 and entering the reflector 4c of the casing 4 is reflected by the reflector 4c of the casing 4 toward the dial plate 2, and is emitted in a manner spreading in a fan shape when viewed from the front of the dial plate 2. Hence, as illustrated in FIG. 1, when viewed from the front, substantially two light transmissive window 20c, the two scales 20b, and the internal numbers 20d relative to the scales 20b (numbers "1" and "2" in FIG. 1) in the dial plate 2 are illuminated in a fan shape at the counterclockwise-direction side of the indicator 3b. Since the prism ASSY 10 rotates together with the needle 3, the fan shaped illuminated portion of the index part 20 of the dial plate 2 rotates together with the rotation of the needle 3. The dial plate 2 has the numbers 20d illuminated from the back as the illumination light guide is lighted up by an unillustrated dial-plate illumination. The numbers 20d may be illuminated by emitted light in a fan shape or not illuminated by such light.

Conversely, the light receiving face 3d of the needle 3 receives light from a (or multiple) light source 6 different from the light source emitting light to the light receiving face 11a of the prism 11. The light emitted from the light source 6 (indicated by an arrow AR3 in FIG. 3) is guided to the light guide 13, and enters the light receiving face 3d of the needle 3. The incident light from the light source 6 through the light receiving face 3d of the needle 3 is reflected by the inclined face 3e of the needle 3, and is guided in the direction of the tip of the needle 3. Hence, the indicator 3b of the needle 3 is lighted up.

As explained above, in the dial plate 2, since the index part 20 is formed as outline characters, when the needle type gauge 1 is viewed from the front, only the tip of the indicator 3b in the needle 3 is visible through the index part 20 (in particular, through the light transmissive window section 20a). Hence, the tip of the needle 3b and strip-shaped illumination are visually recognized in a manner moving in accordance with the measured value, and thus the needle type gauge 1 has an excellent visual effect, resulting in a great looking indication.

The needle type gauge 1 explained above includes the needle 3 which has the main rotating portion 30 rotating around the rotation shaft 3a, and the indicator 3b rotating together with the rotation of the main rotating portion 30 and pointing out the index part 20, and the actuator 7 causing the main rotating portion 30 to rotate. The main rotating portion 30 includes the prism 11 (an example light emitter) that emits strip-shaped light in the direction of the tip of the indicator 3b upon reception of light from the light source 6. The prism 11 is located near the actuator 7 relative to the indicator 3b, and emits, toward a nearby area to the indicator 3b and located at the one side in the rotation direction of the indicator 3b relative to the indicator 3b when the needle type gauge 1 is viewed from the front, the strip-shaped light. The needle 3 includes the shading plate 8 (an example shield) which extends toward the actuator 7 from the indicator 3b, extends along the indicator 3b when the needle type gauge 1 is viewed from the front, and shields light directed to the other side from the one side in the rotation direction of the indicator.

In addition, the needle type gauge 1 further includes the dial plate 2 (an example gauge plate) located at the opposite side to the actuator-7 side of the needle 3, and the reflector 4c facing the prism 11. The index part 20 is included in the dial plate 2, and is at least partially light transmissive. The reflector 4c reflects strip-shaped light emitted from the prism 11 toward the index part 20, and thus the index part 20 is illuminated by the reflected strip-shaped light by the reflector 4c.

Still further, the reflector 4c may include a reflector face formed as a mirror surface, and the strip-shaped light emitted from the prism 11 may be reflected by the reflector face and directed toward the index part 20.

Yet further, the reflector 4c may include a reflector face reflecting light as diffused light, and the strip-shaped light emitted by the prism 11 may be reflected by the reflector face and directed toward the index part 20 in a diffused manner.

The light sources 6 emit light to the prism 11 from the actuator-7 side, and the prism 11 includes the light receiving face 11a facing the light source 6 and receiving light therefrom, and the inclined face 11b reflecting incident light from the light source 6 through the light receiving face 11a in the direction of the tip of the indicator 3b. The light from the light source 6 and reflected by the inclined face 11b is emitted by the prism 11 as strip-shaped light.

The present disclosure is not limited to the above-explained embodiment, and can be carried out in various forms. In the aforementioned embodiment, when viewed from the front, the index part 20 of the dial plate 2 is illuminated at the counterclockwise-direction side in the rotation direction of the indicator 3b, but the index part 20 may be illuminated at the clockwise-direction side in the rotation direction of the indicator 3b. In this case, the shading plate 8 is formed integrally with the needle 3 at the counterclockwise-direction side thereof. This enhances a contrast between an illuminated portion and a non-illuminated portion at a side where the numerical value indicated by the numbers 20b decreases, resulting in an indication with an excellent visual effect. This is suitable for a case in which the index decreases like a needle type gauge informing the user of, for example, a remaining fuel.

The shading plate 8 may be not integrally formed with the needle cap 3f and the cover 3c, and may be a separate piece. When the shading plate 8 is a separate piece, a structure in which the shading plate 8 is attachable to the needle cap 3f or the cover 3c or is directly attachable to the indicator 3b may be employed.

The light guide 13 may be not provided at the opposite side to the direction in which the needle 3 extends, and may be provided at the opposite side to the above-explained position across the axial line of the rotation shaft 3a of the needle 3. In this case, the prism 11 is provided at a location not interfering with the light guide 13.

The multiple light sources 6 may be commonly utilized to illuminate the dial plate 2 and to light up the needle 3. In this case, when the prism 11 and the light guide 13 are disposed so as to be close to each other, the number of light sources can be reduced. When the multiple light sources 6 are not commonly utilized, the color of illumination and that of lighting up may be varied, or the color of illumination and that of lighting up can be varied in accordance with the turning position of the needle.

In the aforementioned embodiment, the prism 11 is utilized as a reflector that reflects light from the light source 6, but for example, a convex mirror or the like may be used as long as it reflects light from the light source 6 as light directed in the direction of the tip of the needle 3 with a predetermined width when the needle type gauge 1 is viewed from the front.

In addition, in the aforementioned embodiment, the prism is transparent, but a visual effect by coloring and patterning for the prism may be obtained as long as the prism is light transmissive.

Still further, in the aforementioned embodiment, the needle type gauge 1 is a vehicular tachometer, but the present disclosure is not limited to this type of gauge. For example, the needle type gauge may be applicable as a fuel gauge indicating a remaining fuel, or a gauge for air-pressure apparatuses indicating air pressure or air flow volume.

Furthermore, the dial plate 2 may be disposed between the needle 3 and the casing 4. In this case, the shading plate 8, the prism 11 and the like are positioned above (in front of) the dial plate 2. In this case, for example, the dial plate 2 may preferably be provided with a through-hole to allow a portion of the needle 3 and/or a portion of the actuator 7 to pass therethrough so that the actuator 7 located at the back of the dial plate 2 causes the needle 3 located in front of the dial plate 2 to rotate. In this case, for example, the prism 11 located in front of the dial plate 2 receives light emitted from the light sources 6 that are located at the back of the dial plate 2, and then emits the received light as strip-shaped light, so that the dial plate 2, especially index part 20, will be illuminated by the strip-shaped light from the front. In this case, an area that is interior with the index part 20 of the dial plate 2 may also be illuminated by the strip-shaped light. The shading plate 8 may be any member that can block the strip-shaped light that is emitted from the prism 11 and travels along the front side of the dial plate 2. Even with this configuration, the needle type gauge 1 has an excellent visual effect, result in a great looking indication.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A needle type gauge comprising:
   a needle comprising a main rotating portion that rotates around a rotation axis, and an indicator which rotates together with the main rotating portion and which points out an index part;
   an actuator located rearward of the needle that causes the main rotating portion to rotate;
   a gauge plate comprising the index part, and located forward of the needle; and
   a casing that includes a first portion located in a position rearward of the indicator,
   wherein:
   the main rotating portion comprises a light transmitting portion that transmits light from a light source, the light transmitting portion located rearward of the indicator;
   the casing comprising a reflector (i) formed as a part of a conical surface, (ii) located rearward of the indicator, and (iii) disposed so as to face the light transmitting portion;
   the index part is at least partially light transmissive;
   the light transmitted by the light transmitting portion advances along a rear side of the indicator without passing through the indicator, and reaches a nearby area of the reflector disposed adjacent to the indicator, the nearby area of the reflector being located on one side of the indicator in a rotation direction of the indicator;
   the reflector reflects the light reaching the nearby area of the reflector toward the index part to illuminate the index part with the light reflected by the reflector;
   the needle comprises a shield that (i) covers one side surface of the indicator, (ii) includes a second portion extending further rearward from a rear end of the indicator toward the first portion, and (iii) extends along the indicator; and
   the second portion of the shield has a back end provided along the first portion, and blocks light directed from the one side of the indicator to another side therein among the light that is transmitted by the light transmitting portion and advances along the rear side of the indicator.

2. The needle type gauge according to claim 1, wherein:
   the reflector comprises a reflector face formed as a mirror face; and
   the light transmitted by the light transmitting portion is reflected by the reflector face and is directed toward the index part.

3. The needle type gauge according to claim 1, wherein:
   the reflector comprises a reflector face that reflects light as diffused light; and
   the light transmitted by the light transmitting portion is reflected by the reflector face and is directed toward the index part in a diffused manner.

4. The needle type gauge according to claim 1, wherein:
   the light source emits light to the light transmitting portion from a rearward position of the light transmitting portion;
   the light transmitting portion comprises a light receiving face which faces the light source and which receives light therefrom, and an inclined face that reflects the incident light from the light source through the light receiving face toward the tip of the indicator; and the light from the light source reflected by the inclined face is emitted from the light transmitting portion.

5. The needle type gauge according to claim 1, wherein the light transmitted by the light transmitting portion includes light spatially spreading in a circumferential direction around the rotation shaft of the needle.

6. The needle type gauge according to claim 1, wherein the light transmitting portion comprises a reflector that reflects the light from the light source, the reflected light having a predetermined width.

* * * * *